(12) United States Patent
Cooper

(10) Patent No.: US 7,261,804 B2
(45) Date of Patent: Aug. 28, 2007

(54) GRAPHITIZED-CARBON FIBER/CARBON CHAR FUEL

(75) Inventor: John F. Cooper, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 519 days.

(21) Appl. No.: 10/676,532

(22) Filed: Sep. 30, 2003

(65) Prior Publication Data

US 2005/0066573 A1    Mar. 31, 2005

(51) Int. Cl.
  *C25F 1/00* (2006.01)
  *H01M 8/14* (2006.01)
(52) U.S. Cl. .................. 205/687; 205/768; 205/343
(58) Field of Classification Search .......... 205/687, 205/768, 343
  See application file for complete search history.

(56) References Cited

U.S. PATENT DOCUMENTS 3,615,829 A * 10/1971 Sprague .................. 429/103
6,319,391 B1 * 11/2001 Holderness et al. .......... 205/768
6,630,113 B1 * 10/2003 Surma ........................ 422/199

FOREIGN PATENT DOCUMENTS

EP     0693305 A1   6/1995
WO     WO94/15004   7/1994

OTHER PUBLICATIONS

Kobayashi Masanobu et al, Carbon Fiber Tow and Its Production Toray Ind. Inc., JP10266066 Appl N. 09076053 filed Mar. 27, 1997.

* cited by examiner

*Primary Examiner*—Arun S. Phasge
(74) *Attorney, Agent, or Firm*—Eddie E. Scott; John H. Lee

(57) ABSTRACT

A method for recovery of intact graphitic fibers from fiber/polymer composites is described. The method comprises first pyrolyzing the graphite fiber/polymer composite mixture and then separating the graphite fibers by molten salt electrochemical oxidation.

10 Claims, No Drawings

GRAPHITIZED-CARBON FIBER/CARBON CHAR FUEL

The United States Government has rights in this invention pursuant to Contract No. W-7405-ENG-48 between the United States Department of Energy and the University of California for the operation of Lawrence Livermore National Laboratory.

RELATED APPLICATIONS

This application is related to U.S. application Ser. No. 10/170879, filed Jun. 12, 2002 entitled "Tilted Fuel Cell Apparatus."

BACKGROUND

High temperature, molten electrolyte, electrochemical cells have been shown to be an efficient method of producing energy particularly when the fuel source is hydrogen gas. Carbon as a fuel source in electrochemical cells has been explored.

SUMMARY OF THE INVENTION

An aspect of the invention includes a method comprising: thermally decomposing a graphite fiber/polymer composite under an inert atmosphere to produce a plurality of graphite fibers bound to a plurality of carbon chars; and separating said carbon chars from said graphite fibers by molten salt electrochemical oxidation.

Another aspect of the invention includes a method comprising: pyrolyzing a mixture of a plurality of graphite fibers and a carbon based material under an inert atmosphere to produce a plurality of graphite fibers bound to a plurality of carbon chars; and separating said carbon chars from said graphite fibers by molten salt electrochemical oxidation.

A further aspect of the invention includes a method comprising: separating a plurality of carbon chars bound to graphite fibers by molten salt electrochemical oxidation.

A further aspect of the invention includes a method comprising: thermally decomposing a mixture of (1) a plurality of graphite fibers and (2) at least one carbon-based material at a temperature ranging from 400-1200° C. under an inert atmosphere to produce a plurality of graphite fibers bound to a plurality of carbon chars; and separating said carbon chars from said graphite fibers by molten salt electrochemical oxidation at a temperature ranging from 700-850° C.

DETAILED DESCRIPTION

A process has been developed to separate and recover the graphite fibers from carbon composite materials. The same process can be used to convert a variety of carbon based materials such as, biomass or agricultural clippings, sawdust, petroleum pitch, coal tar pitch, petroleum tar and pitch, peat, tar derived from tar sands, low rank coals, into fuel. The mixture of carbon material and graphite fibers is first pyrolyzed to create a plurality of carbon chars that are bound to graphite fibers. The plurality of carbon chars that are bound to graphite fibers resulting from the pyrolysis step are then subjected to anodic oxidation at temperatures from 500-800° C. in a molten salt electrochemical fuel cell, such as the high temperature molten salt electrochemical cells described in pending U.S. application Ser. No. 10/170879, filed Jun. 12, 2002, titled "Tilted Fuel Cell Apparatus" and assigned to the same assignee is suitable for carrying out the present invention. The carbon chars are preferentially removed from the graphite fibers, leaving the graphite fibers intact.

Some carbon composites, such as those used in the manufacture of automobiles, represent a large waste stream of graphitized-carbon fibers encased in polymers, e.g., epoxy and plastic materials. Pyrolyzing these carbon composites produces a plurality of carbon chars that are bound to graphite fibers. A fuel source can be created by mixing plastic materials with graphite fibers and then pyrolyzing the mixture. Pyrolyzing plastics (i.e., heating at temperatures from 400° C. to 600° C. under a non-oxidizing atmosphere) causes the plastics to thermally decompose and produce carbon chars. Pyrolysis begins at about 350 and is very rapid above 600 C. There is an inverse dependence of charting time on temperature. When the plastic materials thermally decompose to carbon chars, they attach to the graphite fibers to produce a plurality of carbon chars bound to graphite fibers. Graphite fibers are high-tensile fibers or whiskers made from either (1) rayon, (2) polyacrylonitrile, or (3) petroleum pitch. Binding the carbon chars to the graphite fibers creates a large surface area in which the carbon chars are in contact with the fibers. The graphite fibers serve to increase anodic dissolution efficiency by providing electronic conductivity. Thus a large surface area increases the transfer of electrons from the carbon char undergoing oxidation through the graphite fibers to the current collector.

The pyrolysis may be accelerated by using transition metal oxides. The molten salt can serve as both a thermal medium for supporting pyrolysis and as an electrolyte in the subsequent electrolysis step. Various molten salts can be used, including mixtures of molten alkali or alkaline earth carbonates, halide salts, or salts based on cryolyte ($Na_3AlF_6$). The electrolysis step frees the graphite fibers, which are not readily electrochemically oxidized under conditions resulting in the quantitative oxidation of carbon chars. Graphite and highly graphitized or glassy carbon materials are less reactive than carbon chars by up to four orders of magnitude. The anodic half reaction of the carbon char resulting in carbon dissolution in carbonate is:

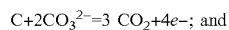

$$C + 2CO_3^{2-} = 3\ CO_2 + 4e-;\ \text{and}$$

the cathodic half reaction in carbonate is oxygen reduction at an inert electrode (e.g., Ni/NiO):

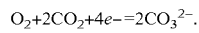

$$O_2 + 2CO_2 + 4e- = 2CO_3^{2-}.$$

The net reaction is the same as the combustion of the char: $C+O_2=CO_2$. The half reactions listed above are the same as those of a carbon/oxygen fuel cell, and would occur with a low potential (electrolysis mode) or with a net production of electrical energy (galvanic mode, negative process energy cost). An inert or glassy carbon cathode would promote reduction of the carbonate melt to CO.

The local temperature increases of the graphite fibers are controllable in a molten salt environment, which prevents the fibers from combusting along with the carbon materials. Because of ability to control the temperature in the molten salt, the more reactive carbon chars are preferentially oxidized under conditions that leave the graphite fibers intact. It is also possible to sparge air through the molten salt and promote oxidation of the chars selectively, but this process is likely to be diffusion controlled and slow compared to the electrochemical oxidation just described.

What is claimed is:

1. A method comprising:

thermally decomposing a graphite fiber/polymer composite under an inert atmosphere to produce a plurality of graphite fibers bound to a plurality of carbon chars; and separating said carbon chars from said graphite fibers by controlling molten salt electrochemical oxidation wherein said carbon chars are converted to carbon dioxide and electrical energy in the presence of oxygen and said graphite fibers are left intact.

2. The method recited in claim 1, wherein the polymer portion of the graphite fiber/polymer composite is selected from the group consisting of polymeric materials such as epoxies, polyethylene, polypropylene, polyacrylics, and copolymers thereof.

3. The method recited in claim 1, wherein said thermal decomposition under an inert atmosphere is accomplished by heating said graphite fiber/polymer composite to a temperature from 400-600° C.

4. The method recited in claim 1, wherein said thermal decomposition occurs in a molten salt electrochemical cell.

5. The method recited in claim 1, wherein the temperature of said molten salt electrochemical oxidation ranges from 500-850° C.

6. The method recited in claim 1, wherein the temperature of said molten salt electrochemical oxidation ranges from 750-800° C.

7. A method comprising:

pyrolyzing a mixture of a plurality of graphite fibers and a carbon based material under an inert atmosphere to produce a plurality of graphite fibers bound to a plurality of carbon chars; and separating said carbon chars from said graphite fibers by controlling molten salt electrochemical oxidation wherein said carbon chars are converted to carbon dioxide and electrical energy in the presence of oxygen and said graphite fibers are left intact.

8. A method comprising:

separating a plurality of carbon chars bound to graphite fibers by controlling molten salt-electrochemical oxidation wherein said carbon chars are converted to carbon dioxide and electrical energy in the presence of oxygen and said graphite fibers are left intact.

9. A method comprising:

thermally decomposing a mixture of (1) a plurality of graphite fibers and (2) at least one carbon-based material at a temperature ranging from 400-1200° C. under an inert atmosphere to produce a plurality of graphite fibers bound to a plurality of carbon chars; and separating said carbon chars from said graphite fibers by controlling molten salt electrochemical oxidation at a temperature ranging from 700-850° C. wherein said carbon chars are converted to carbon dioxide and electrical energy in the presence of oxygen and said graphite fibers are left intact.

10. The method recited in claim 9, wherein said thermal decomposition occurs in a molten salt electrochemical cell.

* * * * *